(12) United States Patent
Wu et al.

(10) Patent No.: US 11,490,280 B2
(45) Date of Patent: Nov. 1, 2022

(54) CARRIER HARMONIZATION FOR RF PERFORMANCE OPTIMIZATION

(71) Applicant: TELEFONAKTIEBOLAGET LM ERICSSON (PUBL), Stockholm (SE)

(72) Inventors: Yi Wu, Beijing (CN); Zhan Shi, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 51 days.

(21) Appl. No.: 16/586,561

(22) Filed: Sep. 27, 2019

(65) Prior Publication Data
US 2020/0107210 A1    Apr. 2, 2020

Related U.S. Application Data

(60) Provisional application No. 62/738,410, filed on Sep. 28, 2018.

(51) Int. Cl.
| | |
|---|---|
| *H04W 24/10* | (2009.01) |
| *H04W 16/16* | (2009.01) |
| *H04W 52/34* | (2009.01) |
| *H04W 72/04* | (2009.01) |
| *H04W 72/12* | (2009.01) |
| *H04W 16/14* | (2009.01) |
| *H04W 24/02* | (2009.01) |
| *H04W 52/14* | (2009.01) |
| *H04W 8/24* | (2009.01) |

(52) U.S. Cl.
CPC ........... *H04W 24/10* (2013.01); *H04W 16/16* (2013.01); *H04W 52/34* (2013.01); *H04W 72/048* (2013.01); *H04W 72/1242* (2013.01)

(58) Field of Classification Search
None
See application file for complete search history.

(56) References Cited

U.S. PATENT DOCUMENTS

| | | | | |
|---|---|---|---|---|
| 2010/0245163 | A1* | 9/2010 | Deshpande | G01S 13/286 342/25 F |
| 2013/0033325 | A1* | 2/2013 | Ladhani | H03F 1/565 330/277 |
| 2014/0341133 | A1* | 11/2014 | Wang | H04W 24/10 370/329 |
| 2016/0270006 | A1* | 9/2016 | Choi | H04W 52/365 |
| 2017/0070961 | A1* | 3/2017 | Bharadwaj | H04L 27/2601 |
| 2017/0250927 | A1* | 8/2017 | Stapleton | H04L 25/02 |
| 2017/0318571 | A1* | 11/2017 | Negus | H01Q 21/20 |
| 2018/0288621 | A1* | 10/2018 | Markwart | H04L 5/0035 |
| 2018/0376341 | A1* | 12/2018 | Khoshnevisan | H04L 5/001 |
| 2019/0058999 | A1* | 2/2019 | Gunasekara | H04W 16/10 |
| 2019/0364565 | A1* | 11/2019 | Hmimy | H04W 72/0453 |

FOREIGN PATENT DOCUMENTS

EP    2618618 B1 *  4/2015  ............. H04L 5/001

* cited by examiner

*Primary Examiner* — Ajit Patel
*Assistant Examiner* — Liem H. Nguyen

(57) ABSTRACT

The present disclosure includes systems and methods for configuring a radio base station of a cellular telecommunications network. An exemplary method includes receiving an instantaneous bandwidth (IBW) capability list from a radio unit that is coupled to an antenna and transmitting a control message to the radio unit to configure radio carriers for the radio unit. The control message is based on the IBW capability list. Associated network nodes are also included.

17 Claims, 6 Drawing Sheets

CARRIER HARMONIZATION FOR RF PERFORMANCE OPTIMIZATION

PRIORITY INFORMATION

This non-provisional application claims priority to and the benefit of U.S. Provisional Patent Application No. 62/738,410, filed on Sep. 28, 2018 and entitled "CARRIER HARMONIZATION FOR RF PERFORMANCE OPTIMIZATION", the disclosure of which is incorporated herein by reference in its entirety.

TECHNICAL FIELD

The disclosed subject matter generally relates to telecommunications and more particularly to the adaptation of the instantaneous bandwidth (IBW) capabilities of one or more radios in a wireless telecommunications network.

BACKGROUND

Fifth generation (5G) communication has been proposed as the next generation wireless telecommunications standard. 5G design aims to achieve higher capacity than current fourth generation (4G) communications. This will allow a higher number of mobile broadband users to consume of higher or limitless data quantities. Such an unprecedented escalation in capacity demand has imposed significant challenges due, in part, to the limited licensed spectrum for cellular networks.

Certain technologies are being developed to mitigate the challenges due to the limited licensed spectrum. Additionally, certain portions of electromagnetic spectrum are going to be made available on certain conditions for use in 5G communication.

In the United States, the Federal Communications Commission (FCC) has recently opened up spectrum in the 3.5 GHz band, called the Citizens Broadband Radio Service (CBRS) band, for commercial use on a priority-based sharing basis. The FCC proposed that a total of 150 MHz in the 3550-3700 MHz CBRS band to be made available for the commercial usage by three tiers of access: Incumbent Access tier with the highest priority, the Priority Access tier for Priority Access License (PAL) users with the medium priority, and the General Authorized Access (GAA) tier users having the lowest priority. A Spectrum Access System (SAS) manages the spectrum and is responsible for ensuring shared use of spectrum in a given census tract. The PAL users are licensed, whereas the GAA users access the spectrum without license.

In the CBRS, the proposed 150 MHz band is divided into two portions: 3550-3650 MHz (ten channels each with the size of 10 MHz) band and 3650-3700 MHz (five channels) band. In a census tract, seven out of ten channels are reserved for the PAL users in the 3550-3650 MHz band. The GAA users can operate in any GAA reserved band, i.e., in the 3650-3700 MHz band or in any unused PAL channels in the 3550-3650 MHz band. However, no PAL user is to be allowed to operate in the GAA reserved band. Thus, GAA users may have access to all of the 150 MHz band if there are no PAL users active in a census tract, but only an 80 MHz band in tract where all the PAL channels are occupied.

Additionally, a significant amount of underutilized spectrum below 6 GHz has motivated operators to combine Long-Term Evolution (LTE) standard technologies with Wi-Fi technologies in certain 5G implementations. The use of LTE communication in unlicensed bands, popularly known as Licensed-Assisted Access (LAA) can provide high performance and a seamless user experience under a unified radio technology. LAA has a physical layer topology to access Wireless Local Area Network (WLAN) band, specifically the 5 GHz U-NII (Unlicensed National Information Infrastructure) bands. However, in datalink layer different medium access techniques such as Clear Channel Access (CCA), Carrier Sensing Adaptive Transmission Access (CSAT), Listen Before Talk (LBT), etc., have been proposed to reduce interference and fairly coexist with the incumbent systems.

LAA utilizes supplemental downlink (DL) secondary component carrier (SCC) assisted by licensed primary component carrier (PCC) via carrier aggregation (CA). Since initial implementations of CA provide for increased downlink bandwidth, carriers could easily implement one or more downlink-only secondary component carriers (SCC) with 20 MHz wide channels in an unlicensed band to give a massive bandwidth boost to their network with localized small cell deployments. The LAA carriers could be dynamically selected from a wide range of 5.160 GHz to 5.875 GHz.

However, the increasing distance between carriers that can be configured for a particular radio unit introduces additional challenges. Instantaneous bandwidth (IBW) defines the maximum distance between the carriers that can be configured in the radio unit. The IBW of a particular radio unit may be influenced by the power amplifier (PA) linearization and the Digital Pre-Distortion (DPD) algorithm. Accordingly, different radios have different IBW capabilities. Many of the existing radios are not able to reach the maximum IBW without any power back off, i.e., a reduction in the output power. But a reduction in the output power can damage the cell coverage and overall network performance.

SUMMARY

Systems and methods relating to the adjustment of power back off settings of an individual radio unit of a cellular telecommunications network or disclosed. The systems and methods may mitigate or eliminate some of the problems of the prior art.

One general aspect includes a method for configuring of a radio base station of a cellular telecommunications network, the method includes receiving an instantaneous bandwidth (IBW) capability list from a radio unit that is coupled to an antenna. The method also includes transmitting a control message to the radio unit to configure radio carriers for the radio unit, where the control message is based on the IBW capability list. Other embodiments of this aspect include corresponding computer systems, apparatuses, and computer programs recorded on one or more computer storage devices, each configured to perform the actions of the methods.

Implementations may include one or more of the following features. The method in which the IBW capability list includes IBW capabilities associated with a plurality of power back-off levels. The method further including requesting the IBW capability list from the radio unit during an initialization process, the initialization process including a carrier configuration process. The method further including determining that a carrier outside of a current IBW of the radio unit is requested. The method may also include determining a power back-off setting that is associated with an IBW capability that includes the carrier outside of the current IBW. The control message may include the determined power back-off setting or settings. The method in which the IBW capability list is stored in a memory of the radio unit. The method further including transmitting information from the IBW capability list to a base station controller. The control message may be further based on a schedule administered by the base station controller. The method further including transmitting information from the IBW capability list to a policy server. The method may also include where the control message is further based on one or more policies administered by the policy server. The policy server may be a spectrum access system (SAS) server that manages spectrum associated with citizens broadband radio service (CBRS) band. Implementations of the described techniques may include hardware, a method or process, or computer software on a computer-accessible medium.

One general aspect includes a network node for communication in a cellular telecommunications network, the network node including a radio unit coupled to an antenna, the radio unit including a memory storing an instantaneous bandwidth (IBW) capability list associated with the radio unit; and baseband processing circuitry. The processing circuitry may be configured to receive the IBW capability list from the radio unit and to transmit a control message to the radio unit to configure radio carriers for the radio unit. The control message is based on the IBW capability list. Other embodiments of this aspect include corresponding computer systems, apparatus, and computer programs recorded on one or more computer storage devices, each configured to perform the actions of the methods.

Implementations may include one or more of the following features. The IBW capability list includes IBW capabilities associated with a plurality of power back-off levels. The network node may include a base station controller, and where the baseband processing circuitry is further configured to: report the IBW capability list to the base station controller. The network node may also include receive carrier allocation information from the base station controller based on the IBW capability list. The network node may be configured to generate the control message for transmission to the radio unit based on the carrier allocation information received from the base station controller. The baseband processing circuitry may be further configured to request the IBW capability list from the radio unit during an initialization process, which may include a carrier configuration process. The baseband processing circuitry or a connected base station controller may be configured to determine that a carrier outside of a current IBW of the radio unit is being required and to determine a power back-off setting that is associated with an IBW capability that includes the carrier outside of the current IBW. The control message may include the determined power back-off setting to be applied by the radio unit.

The network node may further include a base station controller, and baseband processing circuitry may be further configured to transmit information from the IBW capability list to the base station controller. The network node may also include the control message is further based on a schedule administered by the base station controller. The baseband processing circuitry may be configured to transmit information from the IBW capability list to a policy server. The network node may also include receive carrier allocation information from the policy server based on one or more policies administered by the policy server. The network node in which the policy server is a spectrum access system (SAS) server that manages spectrum associated with citizens broadband radio service (CBRS) band. Implementations of the described techniques may include hardware, a method or process, or computer software on a computer-accessible medium.

One general aspect includes a baseband processing system for operating in a cellular telecommunication network, the baseband processing system including may include baseband processing circuitry. The baseband processing system may include a radio-frequency (RF) transceiver, in communication with the baseband processing circuitry, to enable communication with a radio unit. The baseband processing circuitry may be configured to receive, via the RF transceiver, an instantaneous bandwidth (IBW) capability list from the radio unit. The baseband processing system may also transmit, via the RF transceiver, a control message to the radio unit to configured radio carriers for the radio unit. The control message may be based or may include the IBW capability list. Other embodiments of this aspect include corresponding computer systems, apparatus, and computer programs recorded on one or more computer storage devices, each configured to perform the actions of the methods.

Implementations may include one or more of the following features. The IBW capability list may include a plurality of IBW capabilities, with each IBW capability being associated with one power back off level of a plurality power back-off levels. The baseband processing circuitry may be further configured to transmit information from the IBW capability list to a base station controller. The baseband processing system may also receive carrier allocation information from the base station controller. The baseband processing system may also generate the control message based on the carrier allocation information received from the base station controller. The baseband processing system may transmit information from the IBW capability list to a policy server. The baseband processing system may also receive carrier allocation information from the policy server, with the carrier allocation information being based on a policy administered by the policy server. The baseband processing system may also generate the control message based on the carrier allocation information received from the policy server. Implementations of the described techniques may include hardware, a method or process, or computer software on a computer-accessible medium.

Those skilled in the art will more readily appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure. In the drawings, like reference labels denote like features.

Figure 1:
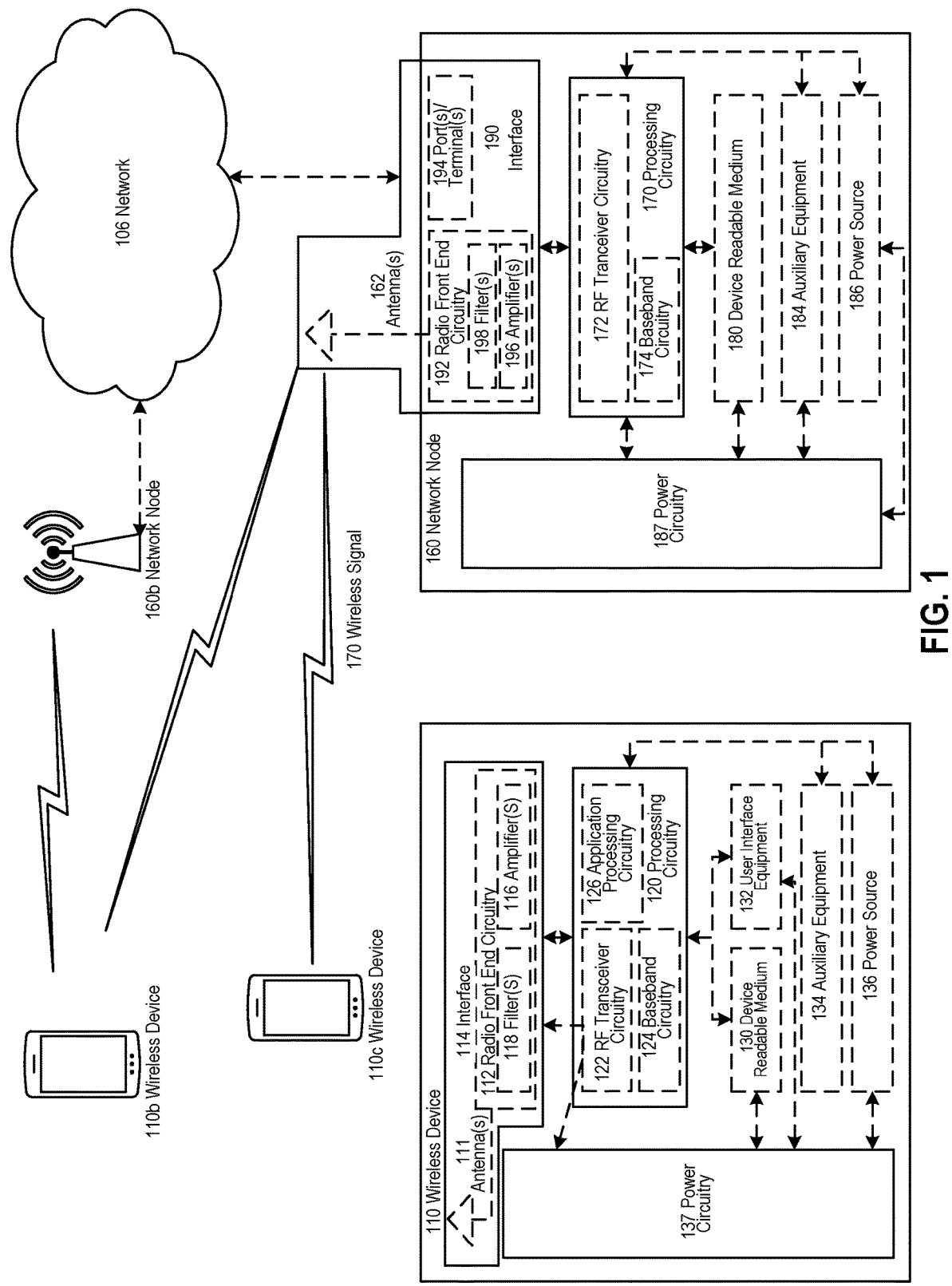
FIG. 1 is a diagram of a wireless network, in accordance with some embodiments.

These figures and other inventive aspects will be better understood in view of the following detailed description.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As the distance between carriers used in providing service to an individual user equipment (UE) increases, the instantaneous bandwidth (IBW) of current radios has become a potentially limiting factor. With the evolution towards 5G, more and more spectrum will be allocated in high frequency band including the 3.5 GHz CBRS and 5 GHz LAA as of today. This definitely pushes for a super high IBW (Instantaneous Bandwidth) on the radio side. In US, operators such as Verizon, AT&T and T-Mobile have already required the CBRS radio to support 150 MHz IBW which is the full band coverage of the whole B48 CBRS frequency band. For the other bands such as LAA and future coming 5G spectrum, there are even higher IBW requirement coming on the way.

There are certain problems that need to be overcome. Although the radio technology has evolved towards the direction of supporting higher bandwidth and higher frequency, there are remaining gaps that the RF performance due to digital pre-distortion (DPD) limitations that cannot fulfill the extremely large frequency distance between carriers. When the carriers configured in the radio are far from each other, the operating band unwanted emission (OBUE) performance will be degraded sometimes and may even fail the regulatory requirements. In order to avoid the OBUE failure, radio units may have to do a power back off, i.e., perform a reduction in the output power, which decreases the cell coverage and degrades network performance. As an example, when a radio at 3.5 GHz frequency is configured with the IBW larger than 120 MHz, the RF Tx power has to be reduced 1-3 dB as may be generally observed in the industry today.

The existing solutions are isolated. On the radio side, the radio unit may handle the optimization and performance trade off based on hardware performance, digital algorithm compensation performance and the overall system performance, while the base station may handle the frequency allocation and carrier aggregation based on cell interference and node-level coordination. To date, there has been no cross-layer coordination between the node system and the radio unit RF behavior.

Certain aspects of the present disclosure and their embodiments may provide solutions to these or other challenges. A new IBW capacity message may be generated to enable communication between radio unit and the baseband (BS scheduler) and/or a network coordinator (such as spectrum allocator). The radio unit may specify the different IBW ranges supportable by the radio unit, which correspond to the different RF performance levels due to the limitation of hardware performance, digital algorithm compensation performance and overall system performance. Such information may be stored in the firmware or database of the radio unit. For example, the information may be stored in some memory of the radio unit at fabrication. In other instances, the information may be stored or updated when the radio unit is in situ.

During an initiation process between the radio unit and the baseband (i.e., during base station setup), the specified IBW range capability list may be reported from the radio unit to the baseband. When the network starts the frequency request/allocation and configures the carrier aggregation (CA), the IBW capability list reported by the radio is taken into consideration since different carrier configuration results in different RF performance, such that the frequency request/allocation and CA are performed based, at least in part, on the IBW capability list. An overall optimized allocation and configuration may, therefore, be approached based on the coordination of different layers.

There are, proposed herein, various embodiments which address one or more of the issues disclosed herein.

Certain embodiments may provide one or more of the following technical advantages. In the past, the spectrum that operators were able to use were fixed and, accordingly, the carrier configuration was pre-defined so that the radio products were designed based on the specific requirements. Today and in the future, it is anticipated that there may be an increasing number of deployment scenarios in which the operator will have at least a portion of its available frequencies allocated on a semi-static or dynamic basis within a larger frequency range. Current examples are CBRS (B48 in 3GPP) and LAA (B46 in 3GPP), although other semi-static and/or dynamic allocation paradigms may be developed in the future.

Radio hardware platforms have their own RF performance limitations due to different carrier configurations with varying IBW. With the proposed method, the RF behavior based on different carrier configurations can be communicated to the baseband and, accordingly, the carrier configuration and operating IBW are introduced as a new dimension for network performance optimization. In a deployment case in which the carrier configuration can be coordinated or selected, an optimized carrier configuration can reduce the OBUE and avoid the power back off, which may improve the overall network performance.

For the radio units that support high IBW, the units may store the IBW capability list with the different performance tradeoffs in the database or firmware of the radio unit. Since the radio unit might be upgraded both with respect to hardware and software, the IBW list may be updated as the radio unit's limitations and capabilities increase and/or decrease.

An example of the network topology is illustrated in FIG. 1, which is described below in more detail. During the initialization phase in which the radio unit builds up the connection with the baseband, the radio unit send a message or multiple messages reporting its IBW capability to the baseband with which it registers. The message or messages may communicate the IBW capability of the radio unit as an IBW capability list. For the cases when the frequency/carriers are allocated in a dynamic or semi-static way, the baseband or the carrier allocator/coordinator should take the IBW capability list of the radio into consideration.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 depicts a network 106 (which may be referred to as a core network), network nodes 160 and 160b, and wireless devices (WDs) 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices. The network 106 may include a plurality of physical and/or virtual servers, including a policy server such as a spectrum access system (SAS) server that may be used in a CBRS configuration, as described herein.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 1, network node 160 includes processing circuitry 170 (also referred to herein as a "baseband"), device readable medium 180, interface 190 (also referred to herein as a "radio unit)", auxiliary equipment 184, power source 186, power circuitry 187, and antenna 162. For example, the processing circuitry 170 may receive an IBW capability list or other IBW capability information from the interface 190. Although the network node 160 may represent a device or (combination of connected devices) that includes the illustrated combination of hardware components, other embodiments may comprise network nodes with different combinations of components. It is to be understood that a network node comprises any suitable combination of hardware and/ or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules). The individual components may be physical connected and may be communicatively connected via cabling.

Similarly, network node 160 may be composed of multiple physically separate components (e.g., a NodeB component and an RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination. As noted herein, the processing circuitry 170 may request, receive, and transmit IBW capacity information. For example, the processing circuitry 170 may request and receive an IBW capacity list from the radio front and circuitry 192. Additionally, the processing circuitry 170 may transmit the IBW capacity list (or other IBW capacity information) to the network 106. In some embodiments, this may be done by communicating the information to the network 106, via the terminals or ports 194 of the interface 190. The processing circuitry 170 may also transmit instructions to the antenna or antennas 162 to select an optimal power back offsetting as will be described herein in greater detail.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB, baseband, or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

The network node 160 may further include a device readable medium 180 that may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments, a part of antenna 162. Radio front end circuitry 192 comprises filters 198 and amplifiers 196. When a power back off setting is needed, appropriate instructions I sent to the amplifiers 196 to implement the power back off. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162 or via multiple antennas 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 (or to multiple antennas 162) without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown). The interface 190 may include a memory in the radio front end circuitry 192 that stores an IBW capability list for the radio unit or interface 190.

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 1 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD), like the wireless device 110 of FIG. 1, refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, WD 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments, processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 2:
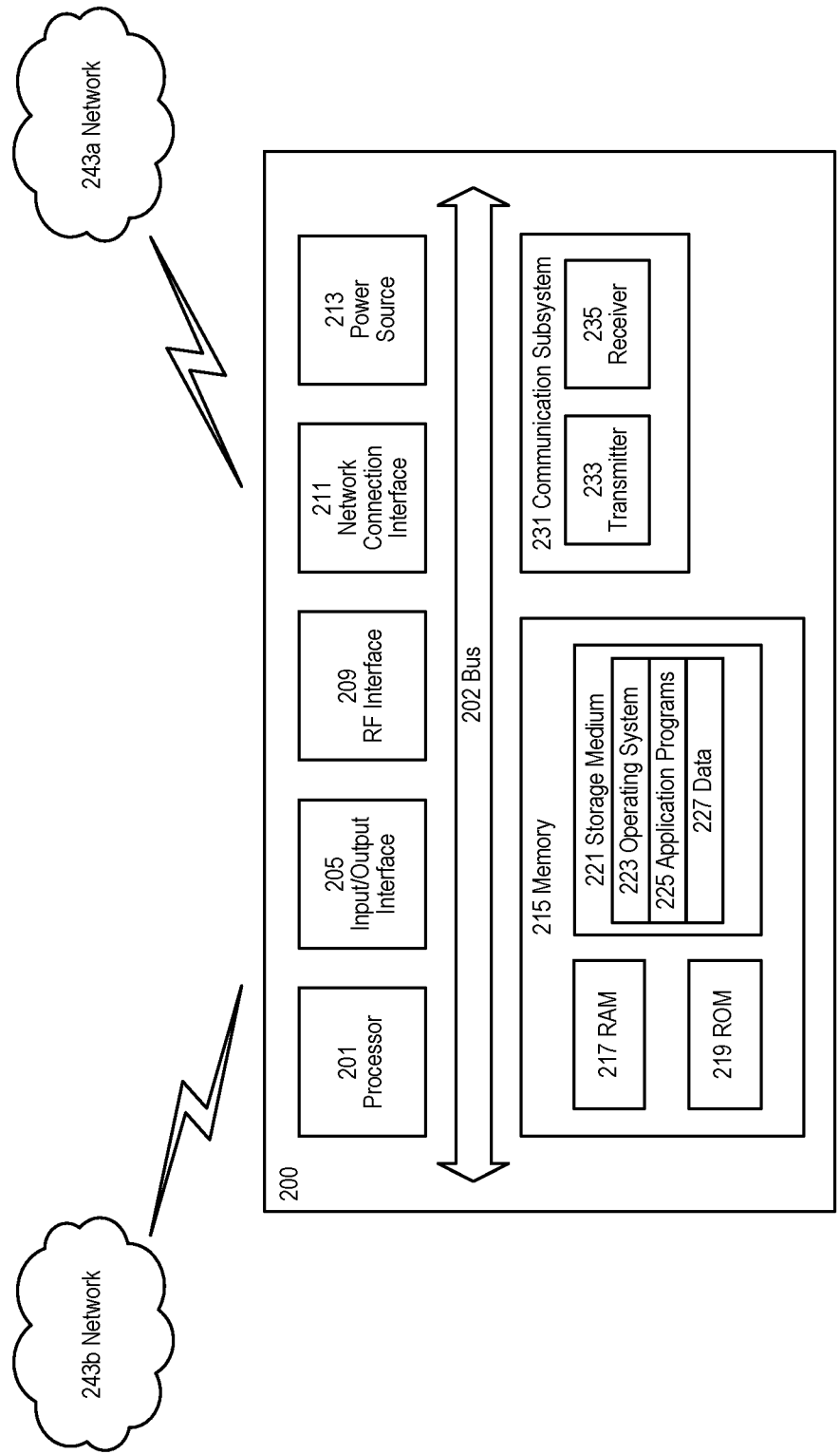
FIG. 2 is a block diagram of a user equipment, accordance with some embodiments.

FIG. 2 illustrates one embodiment of a WD, referred to as user equipment (UE) 200, in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 2, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 2 is a UE, the components discussed herein are equally applicable to a WD, and vice-versa.

In FIG. 2, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231 (including transmitter 233 and a receiver 235), power source 213, and/or any other component, or any combination thereof. Storage medium 221 includes operating system 223, application program 225, and data 227. In other embodiments, storage medium 221 may include other similar types of information. Certain UEs may utilize all of the components shown in FIG. 2, or only a subset of the components. The level of integration between the components may vary from one UE to another UE. Further, certain UEs may contain multiple instances of a component, such as multiple processors, memories, transceivers, transmitters, receivers, etc. As shown in FIG. 2, the UE 200 may communicate with one or more of networks 243*a* and/or 243*b*, as described herein.

Figure 3:
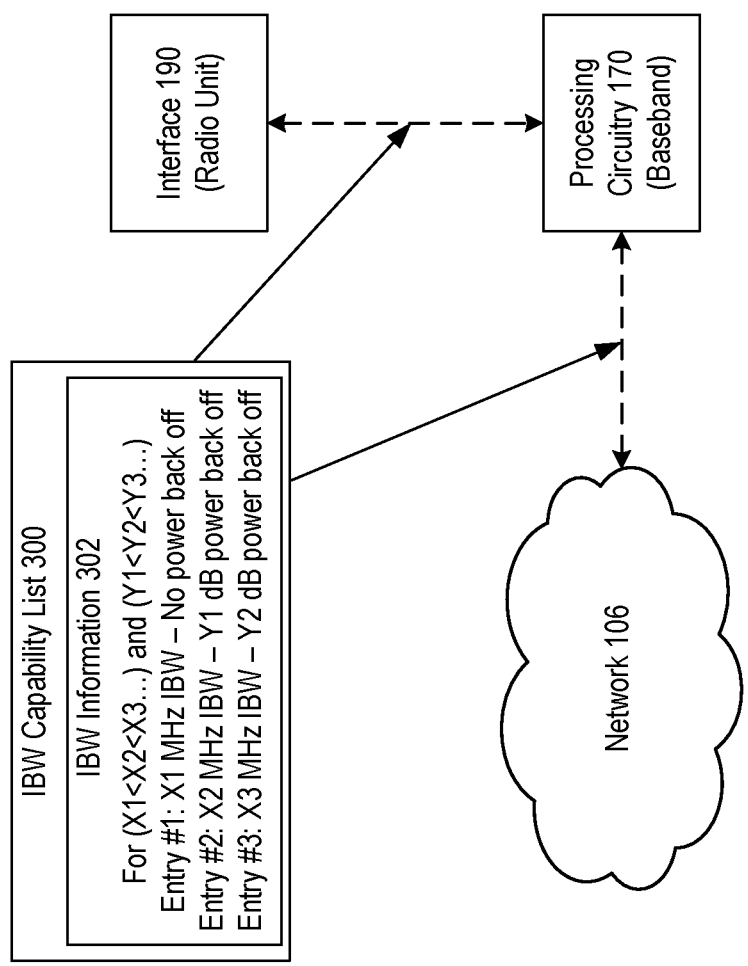
FIG. 3 depicts an exemplary embodiment of an IBW capability list, in accordance with some embodiments.

FIG. 3 depicts an exemplary embodiment of an IBW capability list 300. As described herein, the radio unit or the radio front end circuitry 192 associated with the antenna 162 may communicate the IBW capability list 300 or another IBW message include comparable IBW information associating IBW and power back off levels. As depicted, the IBW capability list 300 may include IBW information 302, which may be formatted so as to be readable by the processing circuitry 170 or the baseband. The processing circuitry may request the IBW capability information from the radio unit, such that the IBW capability list 300 is transmitted as a reply to the request. In other embodiments, the IBW capability information is transmitted from the radio unit without a specific request from the processing circuitry 170. As is described further herein, the processing circuitry 170 may retransmit the IBW capability information to one or more entities within the network 106. The retransmitted IBW capability information may be a copy of the IBW capability list 300 or may be altered by reprocessing or reformatting by the processing circuitry 170 prior to sending the IBW capability information to the network 106.

Figure 4:
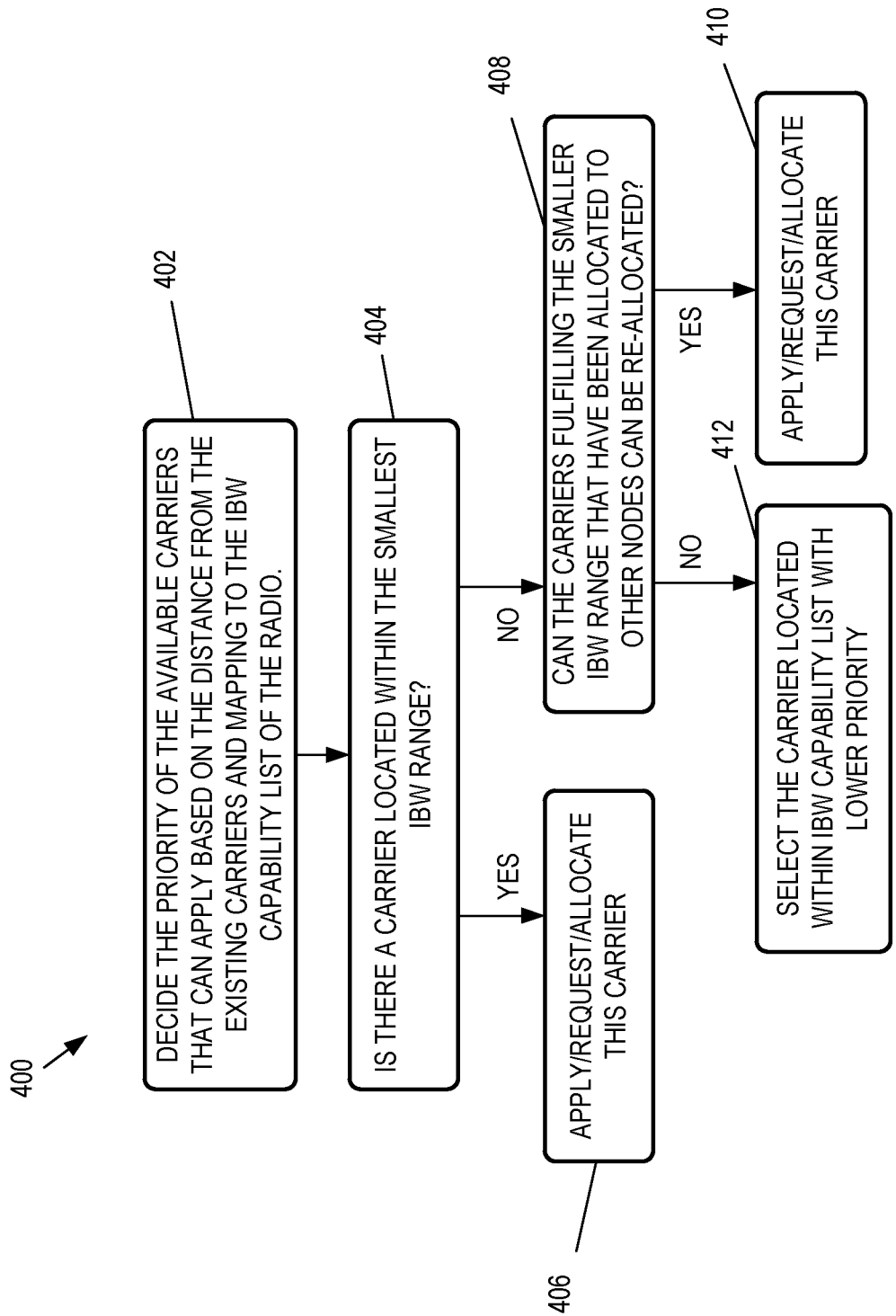
FIG. 4 is a flowchart of a method of adjusting the power back off settings of radio unit, in accordance with some embodiments.

FIG. 4 is a flowchart of a method 400 of adjusting the power back off settings of radio unit in order to increase the IBW of the radio unit as needed. Embodiments of the method 400 may include additional steps or operations beyond those that are illustrated and specifically enumerated in FIG. 4. For example, additional steps or operations may be included before, after, in between, or as part of the enumerated operations. In some embodiments, alternative operations may be performed in place of one or more of the enumerated operations.

Embodiments of the method 400 may begin at an operation 402 in which the priority of available carriers that can apply based on the distance from existing carriers and a mapping to the IBW capability list of the radio is decided. This may be done by the processing circuitry 170, in some embodiments, and may be performed responsive to receipt of an IBW capability list, like the IBW capability list 300 of FIG. 3. Information regarding the available carriers may be received from the network 106. For example, available carrier information may be received from a SAS server included in some embodiments of the network 106.

At the operation 404, it may be determined whether there is a carrier located within the smallest IBW range of the radio unit. When it is determined that the carrier is located within the smallest IBW range, then the carrier frequencies may be applied to the radio unit and allocated by the network node 160, at operation 406. When it is determined that the carrier is not located within the smallest IBW range of the radio unit, the network node 160 may determine whether the carriers that would fill the smaller IBW range have been allocated to other nodes and whether those carriers can be reallocated to the present node, at operation 408.

When it is determined that suitable carriers can be reallocated, the carriers are reallocated by the network node 160 and applied to the radio unit, at an operation 410. When the carriers fulfilling the smaller IBW range have been allocated to other nodes and cannot be reallocated to the present node, the baseband may determine to utilize a carrier accessible by the radio unit (within the IBW capability list) but at a lower power (higher power back off) setting. At an operation 412, priority may be given to lower power back off settings for any given radio unit, as the lower power back off settings may provide for a higher range and improved network communication.

Figure 5:
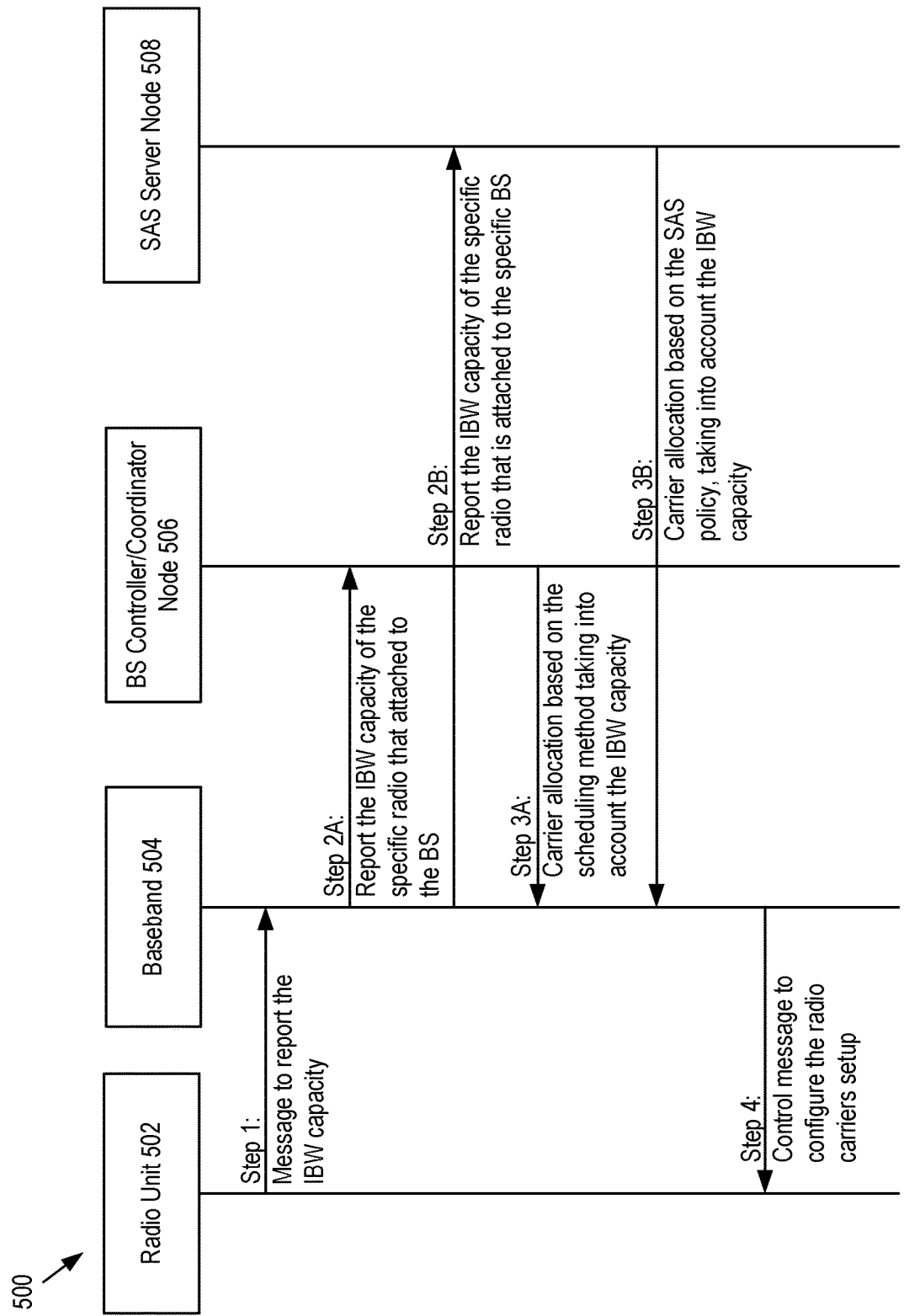
FIG. 5 is an interaction flow diagram showing the interaction of multiple components over a period of time to configure the carriers of a radio unit based on the IBW capabilities of the radio unit.

FIG. 5 is an interaction flow diagram 500 showing the interaction of multiple components over a period of time to configure the carriers of a radio unit. The flow diagram depicts the interactions of a radio unit 502, a baseband 504, a base station controller/coordinator node 506, and an SAS server node 508. As shown in step 1, the radio unit 502 may sends a message to report its IBW capability to the baseband 504. This may be done during an initialization phase or an initial carrier allocation phase. In some embodiments, the flow diagram further includes a step 2A, in which the baseband 504 communicates or reports the IBW capability of the radio unit 502 to the base station controller node or coordinator node 506. The coordinator node 506 may communicate with a plurality of basebands 504 to coordinate carrier allocation among them. Such embodiments may include a step 3A in which the node 506 determines a carrier allocation based on a scheduling method or a spectrum allocation, while taking into account the IBW capability of the radio unit 502. At a step 4, the baseband 504 communicates a control message to the radio unit 502 to configure the radio carriers setup.

In some embodiments of the flow diagram 500 may include a step 2B, in which the baseband 504 reports the IBW capacity of the radio unit 502 to another network device in the network 106, such as an SAS server node 508. This may be done by retransmitting an IBW capacity list, as in FIG. 3, or may be done by processing or reformatting the IBW information from such an IBW capacity list. When the IBW capacity information is sent to an external network device, such as the SAS server node 508, the node may then determine an appropriate carrier allocation based on a policy, such as an SAS policy, while taking into consideration the IBW capability of the radio unit 502. Accordingly, the SAS policy server may determine the carrier allocation based on the SAS policy and the IBW capability of the radio unit 502.

Figure 6:
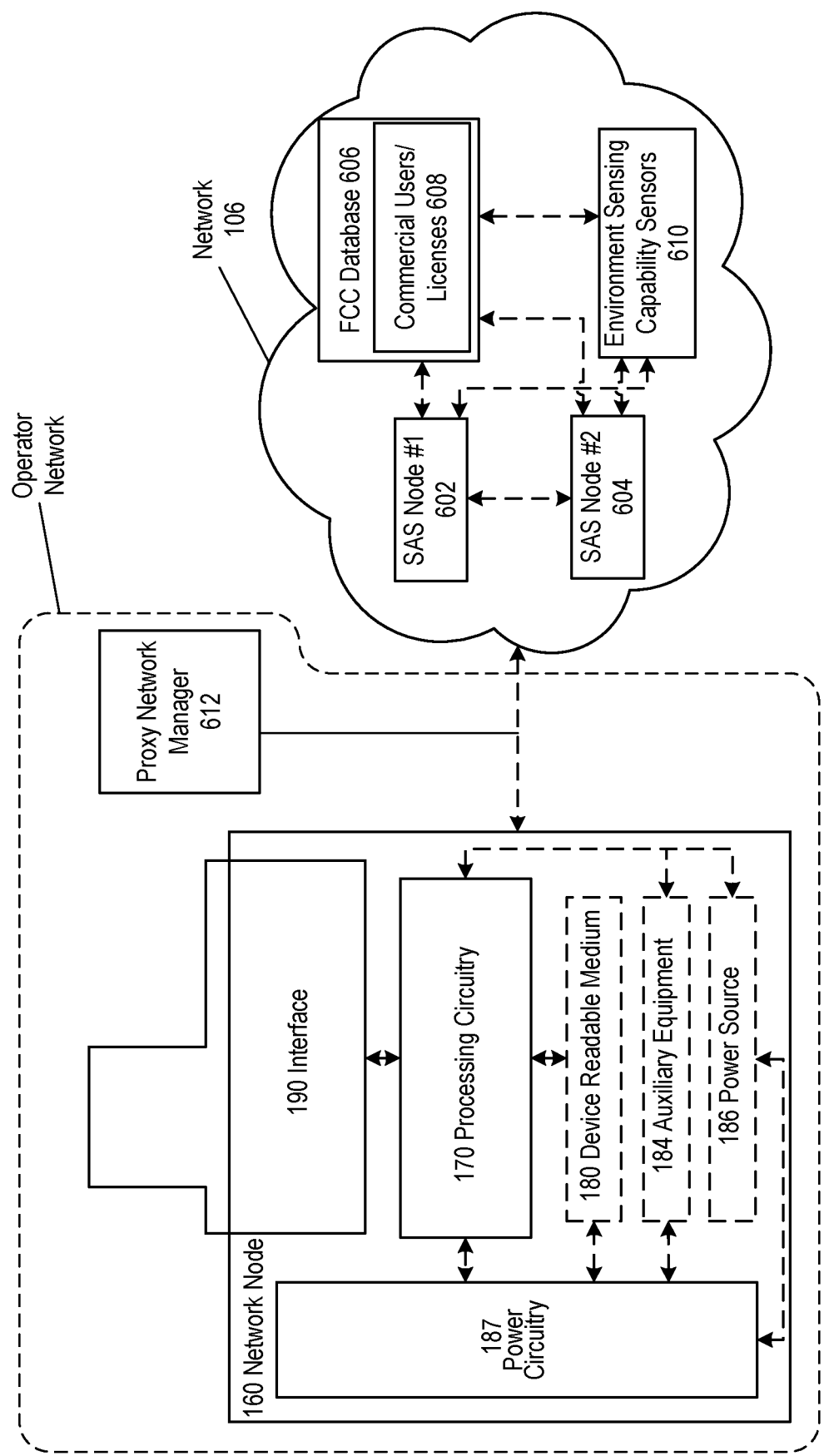
FIG. 6 is a diagram of an end-to-end CBRS architecture showing an operator network in communication with a spectrum access system.

FIG. 6 depicts illustrates an exemplary end-to-end CBRS architecture showing an operator network, include a network node 160 as in FIG. 1, in communication with a network 106. The network 106 shown in FIG. 6 includes a Spectrum Access System (SAS) server or node 602 and a second SAS node 604. These nodes of network 106 may receive requests from the operator network, or from the network node 160 via a proxy network manager 612, which may coordinate between the plurality of network nodes and the network 106 and/or the SAS nodes 602 and 604 within the network 106. The message flow of the IBW capability of connected radio units is transmitted by the radio nodes reporting to baseband. This information may then be combined with other control messages and reported from the network node 160 to the Spectrum Access System (which may include multiple SAS nodes) so that when the frequency allocation is determined, such a carrier separation distance capability can be included in decision making. The nodes 602 and 604 may be communicatively coupled to a third-party database, such as a database 606 maintained by on or behalf of the governmental body charged with regulating spectrum use, such as the FCC in the United States. The database 606 may include information regarding commercial users and/or licenses 608. Additionally, the network 106 may include environmental sensing capability sensors 610, which may be deployed to detect potential interference with other electromagnetic equipment, such as radars employed on ships. In such embodiments, the function of carrier allocation should be located at controlling system such as SAS server.

Radio hardware is designed based on RF technology and the supported IBW is often limited due to hardware performance, digital algorithm compensation performance, and overall system performance. The performance trade off due to different IBW configurations may be stated in radio hardware documentation or specifications but has not been tightly connected to the practical overall system. The proposed systems and methods of the present disclosure utilize new message signalling between radio hardware and the baseband/network coordinator so that the particular radio performance trade offs due to different IBW configurations can be taken into consideration to improve the overall network performance for the carrier allocation process.

Such systems and methods may be especially useful for the coming CBRS, License Assistant Access (LAA), and other spectrum usage regimes where the required IBW is comparatively large and the allocation of carriers can be semi-static or dynamic. In LAA, carrier allocation is decided autonomously by the base station after sensing the environment. However, without the benefits of the present disclosure, the base station will only decide based on the interference it detects without the knowledge of the radio IBW/power back off limitations in the current decision strategy. But because there is an Effective Isotropic Radiated Power (EIRP) limit for the LAA node, which limits the maximum total power on all carriers, the motivation for the LAA radio to have more carriers may not be as high as in CBRS (and comparable regimes in other jurisdictions) which means higher IBW may become more attractive for LAA as to the extent that power limits may be relaxed in the future.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

IBW Instantaneous Bandwidth
SAS Spectrum Access System
CBRS Citizens Broadband Radio Service
LAA License Assisted Access
DPD Digital Pre-Distortion
EIRP Effective Isotropic Radiated Power
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

What is claimed is:

1. A method for configuring of a radio base station of a cellular telecommunications network, the method comprising:
receiving an instantaneous bandwidth (IBW) capability list from a radio unit that is coupled to an antenna, wherein the IBW capability list includes IBW capabilities respectively associated with each of a plurality of power back-off levels, wherein IBW defines a maximum distance between radio carriers that can be configured in the radio unit; and
transmitting a control message to the radio unit to configure select radio carriers for the radio unit, wherein the control message is based on the IBW capability list and is associated with a semi-static or dynamic carrier allocation service.

2. The method of claim 1, further comprising:
requesting the IBW capability list from the radio unit during an initialization process, the initialization process including a carrier configuration process.

3. The method of claim 1, further comprising:
determining that a carrier outside of a current IBW of the radio unit is requested; and
determining a power back-off setting that is associated with an IBW capability that includes the carrier outside of the current IBW, and
wherein the control message includes the determined power back-off setting.

4. The method of claim 1, wherein the IBW capability list is stored in a memory of the radio unit.

5. The method of claim 1, further comprising:
transmitting information from the IBW capability list to a base station controller, and
wherein the control message is further based on a schedule administered by the base station controller.

6. The method of claim 1, further comprising:
transmitting information from the IBW capability list to a policy server, and
wherein the control message is further based on one or more policies administered by the policy server.

7. The method of claim 6, wherein the policy server is a spectrum access system (SAS) server that manages spectrum associated with Citizens Broadband Radio Service (CBRS) band.

8. A network node for communication in a cellular telecommunications network, the network node comprising:
a radio unit coupled to an antenna, the radio unit comprising a memory storing an instantaneous bandwidth (IBW) capability list associated with the radio unit, wherein the IBW capability list includes IBW capabilities respectively associated with each of a plurality of power back-off levels, wherein IBW defines a maximum distance between radio carriers that can be configured in the radio unit; and
baseband processing circuitry configured to:
receive the IBW capability list from the radio unit; and
transmit a control message to the radio unit to configure select radio carriers for the radio unit, wherein the control message is based on the IBW capability list and is associated with a semi-static or dynamic carrier allocation service.

9. The network node of claim 8, further comprising a base station controller, and wherein the baseband processing circuitry is further configured to:
report the IBW capability list to the base station controller;
receive carrier allocation information from the base station controller based on the IBW capability list; and
generate the control message for transmission to the radio unit based on the carrier allocation information received from the base station controller.

10. The network node of claim 8, wherein the baseband processing circuitry is further configured to request the IBW capability list from the radio unit during an initialization process, the initialization process including a carrier configuration process.

11. The network node of claim 8, wherein the baseband processing circuitry or a connected base station controller is configured to:
determine that a carrier outside of a current IBW of the radio unit is being required; and
determine a power back-off setting that is associated with an IBW capability that includes the carrier outside of the current IBW, and
wherein the control message includes the determined power back-off setting to be applied by the radio unit.

12. The network node of claim 8, further comprising a base station controller, and wherein:
the baseband processing circuitry is further configured to transmit information from the IBW capability list to the base station controller; and
the control message is further based on a schedule administered by the base station controller.

13. The network node of claim 8, wherein the baseband processing circuitry is configured to:
transmit information from the IBW capability list to a policy server; and
receive carrier allocation information from the policy server based on one or more policies administered by the policy server.

14. The network node of claim 13, wherein the policy server is a spectrum access system (SAS) server that manages spectrum associated with Citizens Broadband Radio Service (CBRS) band.

15. A baseband processing system for operating in a cellular telecommunication network, the baseband processing system comprising:

baseband processing circuitry; and radio-frequency (RF) transceiver, in communication with the baseband processing circuitry, to enable communication with a plurality of radio units, and wherein the baseband processing circuitry is configured to:

receive, via the RF transceiver, an instantaneous bandwidth (IBW) capability list from the plurality of radio units, wherein IBW defines a maximum distance between radio carriers that can be configured in the radio units and the IBW capability list includes a plurality of IBW capabilities, with each IBW capability being respectively associated with each of one power back-off level of a plurality power back-off levels; and transmit, via the RF transceiver, a control message to the plurality of radio units to configure select radio carriers for each radio unit, wherein the control message is based on the IBW capability list and is associated with a semi-static or dynamic carrier allocation service.

16. The baseband processing system of claim 15, wherein the baseband processing circuitry is further configured to:

transmit information from the IBW capability list to a base station controller;

receive carrier allocation information from the base station controller; and generate the control message based on the carrier allocation information received from the base station controller.

17. The baseband processing system of claim 15, further configured to:

transmit information from the IBW capability list to a policy server;

receive carrier allocation information from the policy server, the carrier allocation information being based on a policy administered by the policy server; and generate the control message based on the carrier allocation information received from the policy server.

* * * * *